Oct. 8, 1940.   D. A. MEEKER   2,217,069
COFFEE MILL
Filed Feb. 8, 1936   4 Sheets-Sheet 3
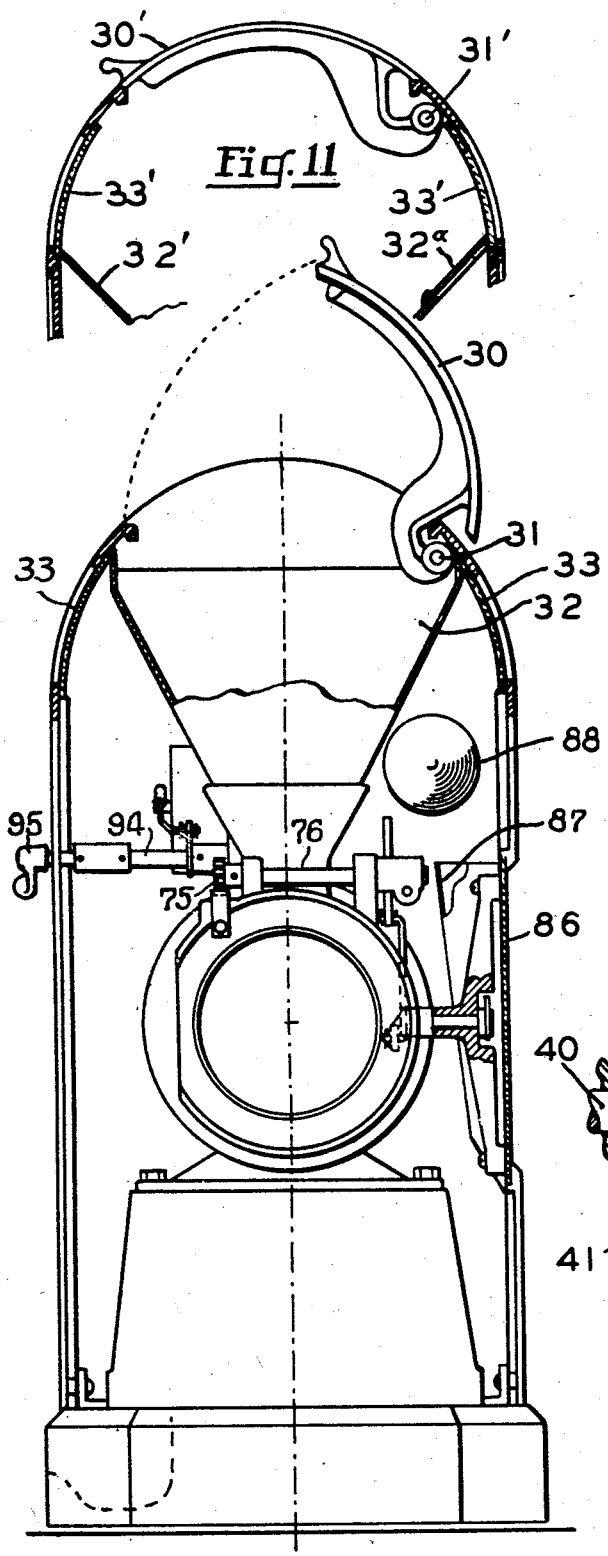
Fig. 11
Fig. 4
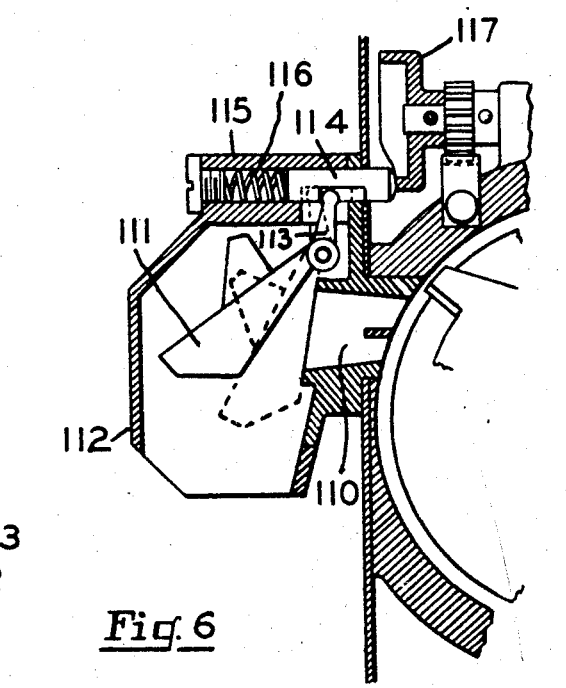
Fig. 6
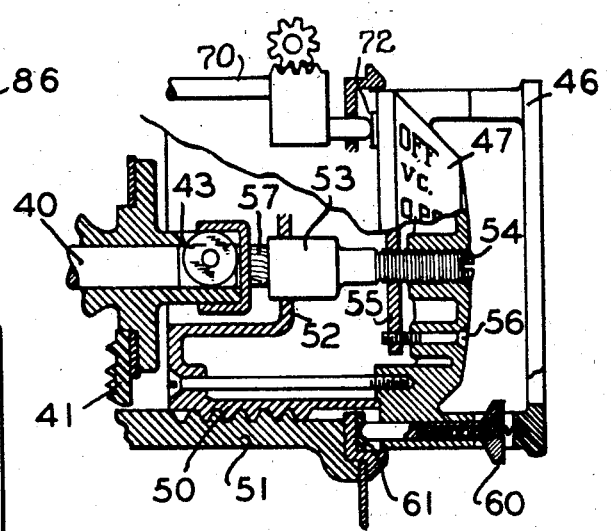
Fig. 5
INVENTOR
David A. Meeker
BY
Maréchal & Noe
ATTORNEYS Oct. 8, 1940.  D. A. MEEKER  2,217,069
COFFEE MILL
Filed Feb. 8, 1936    4 Sheets-Sheet 4
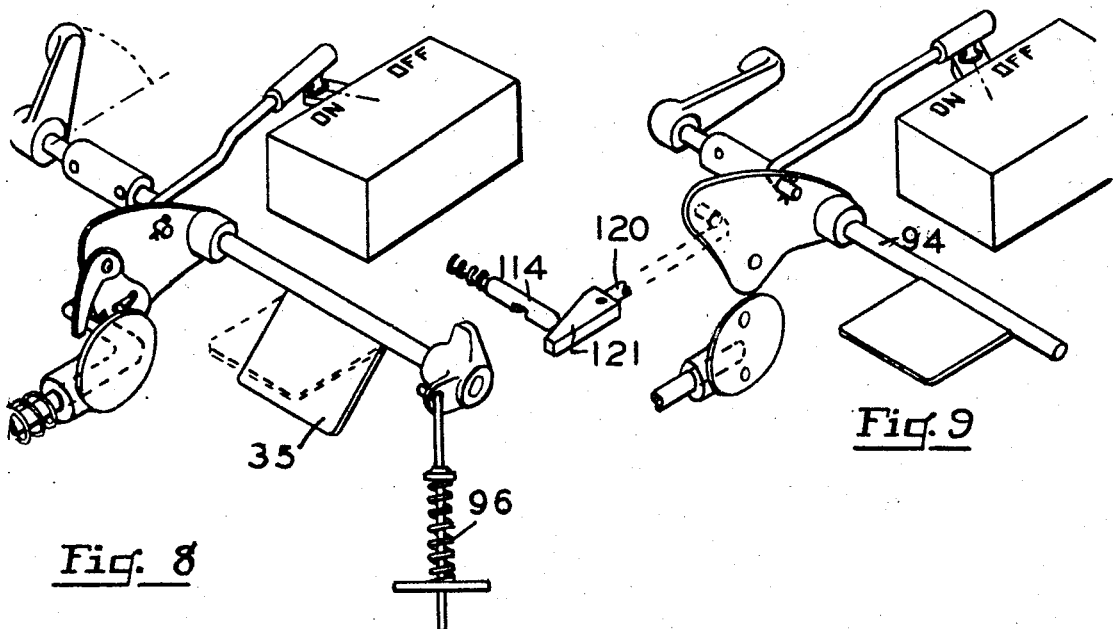
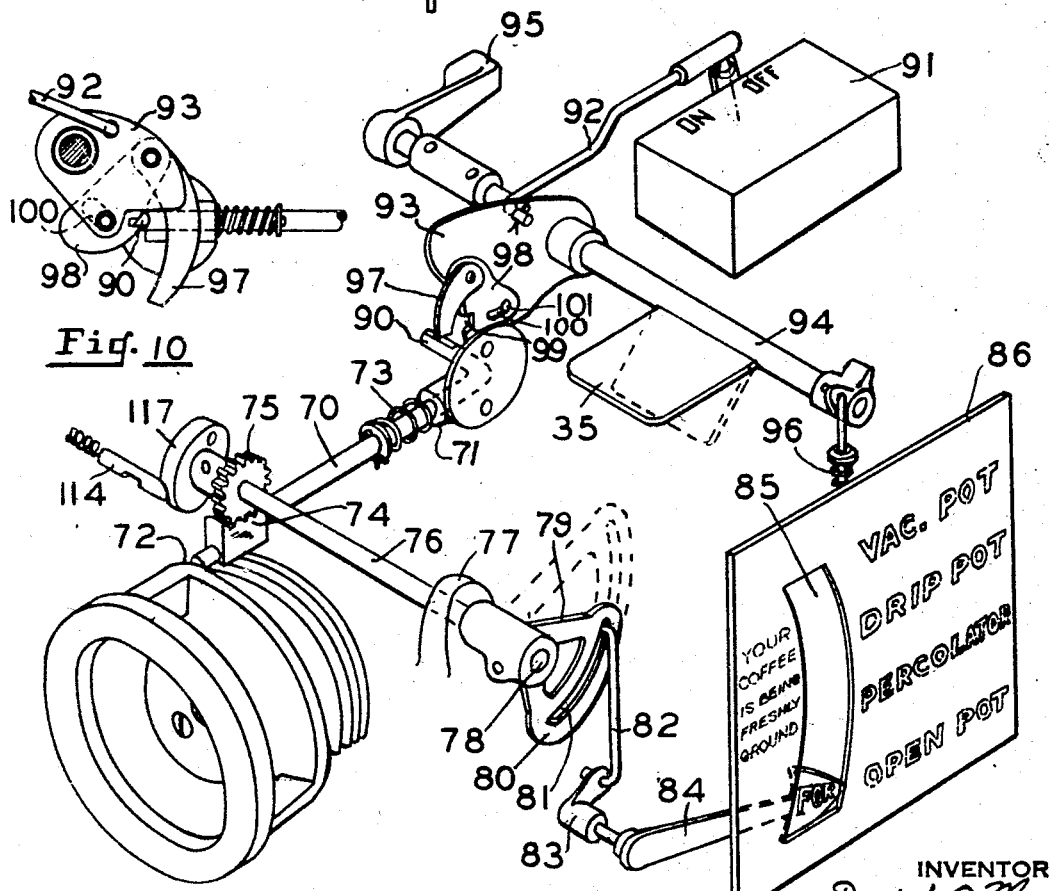

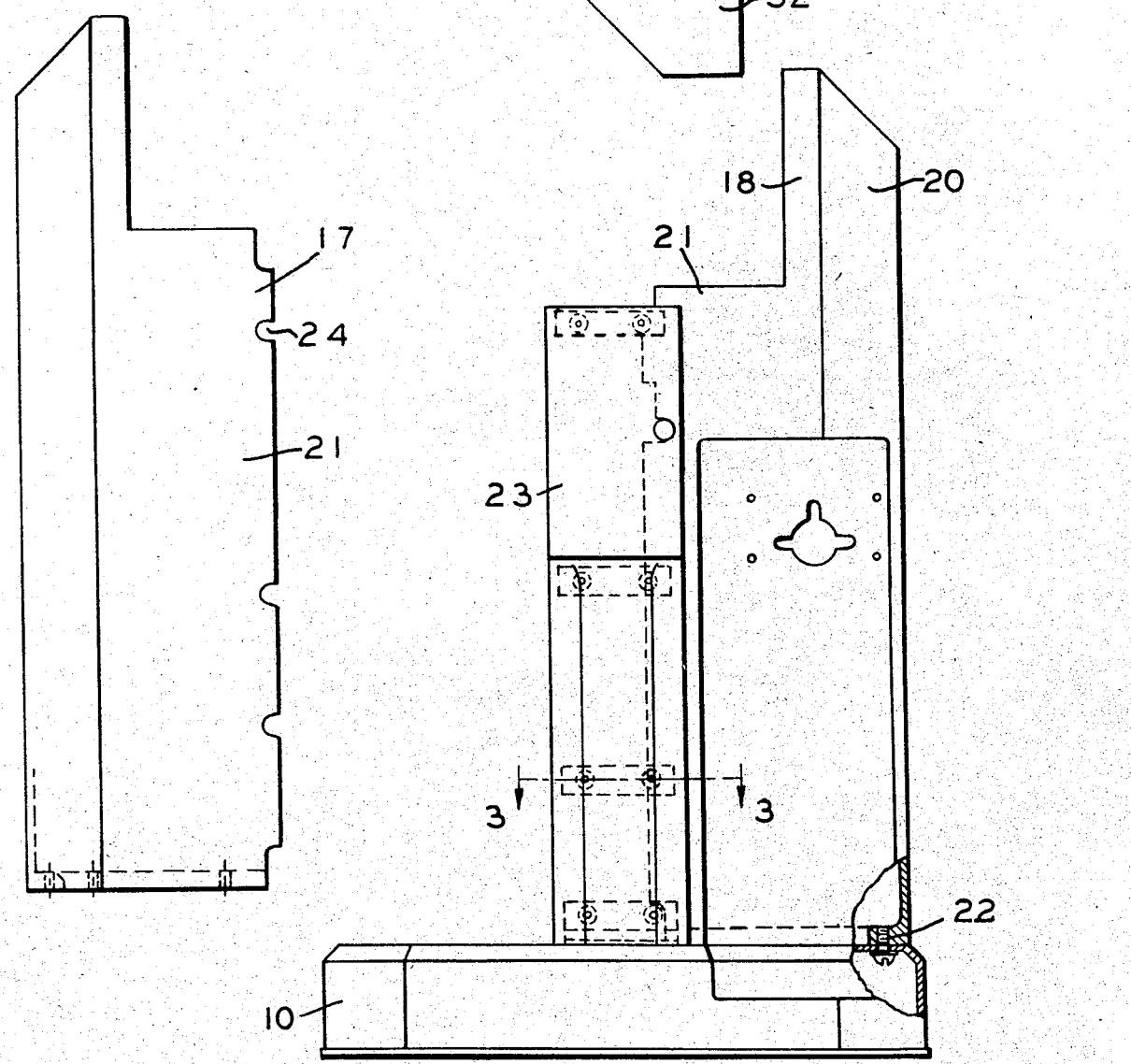

Patented Oct. 8, 1940

2,217,069

UNITED STATES PATENT OFFICE 2,217,069

COFFEE MILL

David A. Meeker, Troy, Ohio, assignor to The Hobart Manufacturing Company, Troy, Ohio, a corporation of Ohio Application February 8, 1936, Serial No. 62,967

14 Claims. (Cl. 83—18)

This invention relates to food handling apparatus and more particularly to mills for grinding coffee and the like.

Several different methods of making coffee are known and in general use and in order to secure the most satisfactory results in each case it is desirable that the coffee be ground to a predetermined degree of fineness. For example, coffee should be quite coarsely ground for use in the open pot method, and should be more finely ground for the drip and the like methods. Coffee mills as used in retail stores have been provided with means for regulating the grade or fineness of the grind, but it has often occurred, particularly during rush periods, that an order or a series of orders are filled without adjusting the setting of the coffee mill. Thus the coffee is not ground with the proper characteristics for the particular customer's use.

It is accordingly the principal object of the present invention to provide a coffee mill adapted to grind coffee to a plurality of different grades of fineness, and having means for indicating to the customer the grade to which the coffee is being ground, so that the customer can readily see whether the mill is grinding coffee to the proper grade for the particular purpose desired.

It is a further object to provide a coffee mill of this character having grade selector means for adjusting the fineness of grind, and an indicating means beyond the direct control of the operator for indicating to the customer the setting of the grade selector, so that the customer will be advised as to the actual grinding condition at which the mill is operated.

It is a further object to provide a coffee mill having provision for requiring a predetermined setting of the grade selector mechanism prior to each grinding operation, so that a setting operation will be required for each operation of the mill, and the setting to which the mill is adjusted will be clearly indicated to the customer.

It is also an object to provide a coffee mill adapted to grind to a predetermined grade or fineness and to discharge the ground coffee completely therefrom as a homogeneous ground product of the fineness desired.

It is a still further object to provide such a food handling device of this character which is simple in construction, inexpensive to manufacture, and highly effective and satisfactory in use.

Other objects and advantages will be apparent from the following description, the accompanying drawings, and the appended claims.

In the drawings—

Fig. 2 is an elevational view of the casing or housing structure with the several parts thereof separated;

Fig. 3 is a horizontal detail sectional view on the line 3—3 of Fig. 2;

Fig. 4 is a sectional view through the mill looking toward the end, with the grade selector mechanism being removed from operative position to more clearly show the structure of the mechanism;

Fig. 5 is a view partially in elevation and partially in vertical section showing the grade selector mechanism;

Fig. 6 is a vertical sectional view showing the means for controlling the discharging of ground material from the mill;

Fig. 7 is a view in perspective showing the construction of mechanism which provides for giving visual indication to the customer of the condition of the mill, and of interlock mechanism providing for predetermined sequence in operations;

Fig. 8 is a similar view of a portion of the interlock mechanism in a different position;

Fig. 9 is a view in perspective of a modified control mechanism;

Fig. 10 is a vertical detail sectional view of a portion of the interlock mechanism in interlocking position; and Fig. 11 is a fragmentary vertical sectional view corresponding to Fig. 4 of a somewhat modified construction.

Figure 1:
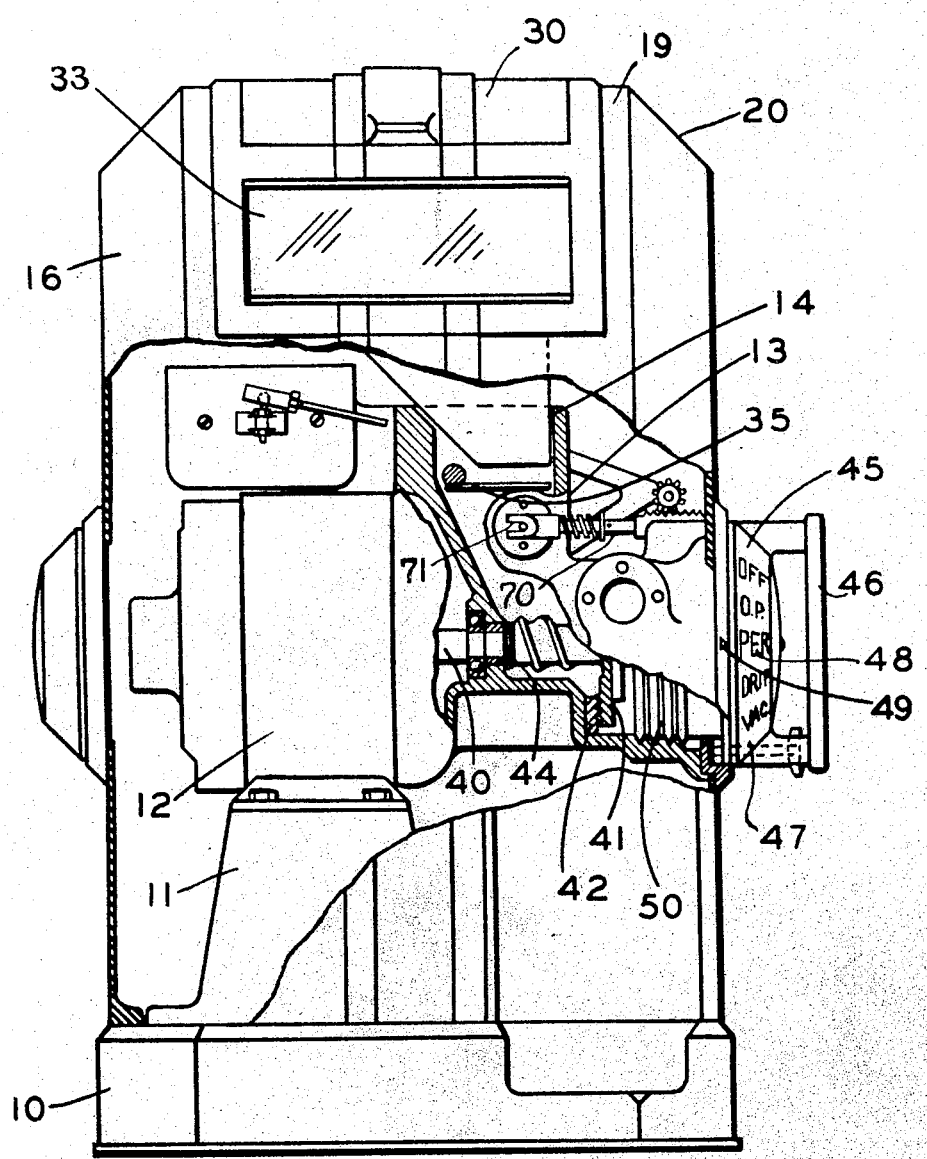
Fig. 1 is a view in elevation with certain parts being broken away of a coffee mill constructed in accordance with the present invention.

Referring to the drawings, which disclose a preferred embodiment of the invention, there is shown at 10 a base member of suitable construction such as a die casting of aluminum or the like, upon which there is mounted an upstanding pedestal portion 11 providing a mounting for the driving motor 12. The motor supports a projecting grinder or burr casing 13 extending from one side thereof and having an upwardly opening portion 14 adapted to receive the coffee or like material to be ground.

The motor and grinding mechanism is enclosed within a suitable housing 16 which is preferably constructed in the following manner. The housing comprises a pair of molded end and side wall sections 17, 18, formed from a phenolic condensation material. These housing sections are provided with a curved top portion 19, having beveled end portions 20, and laterally extending side wall portions 21, extending toward each other. The two housing sections are fastened to the base by means of bolts 22, and are further held in assembled position by means of a metal plate 23 which is positioned in vertical arrangement along the wall portions 21, and is provided with means for receiving and retaining the adjacent wall portions of the two housing sections. For this purpose the wall sections are notched as shown at 24, in corresponding positions, and the plate 23 is provided with bosses 25 formed on its inner face which are suitably tapped to receive screws 26 which serve to removably hold flexible strips 27 in interengaged relationship with the walls 21 as shown. The outer edge of the flexible member 27 is bent as shown in Fig. 3 to provide for the interfitting of the adjacent wall sections thereinto, this construction providing for yieldably retaining these wall portions in place, but permitting the separation thereof when desired for removing the housing section from the mill.

At the top of the housing sections is positioned a cover member 30 which is suitably pivoted at 31 to a hopper structure 32, the outer contour of the cover section 30 preferably being such that when in closed position, it conforms generally to the curving portion 19 of the housing. The cover may be opened as shown to provide for the filling of the hopper with the coffee or other material to be ground. It may also be provided with a translucent opening 33 on the front or customer's side, as shown in Fig. 4, upon which light is cast from a suitable source within the casing. Advertising matter may be associated with this opening so that it will appear as an illuminated sign when the light is turned on and the mill is in operation.

Fig. 11 shows a modified construction in which the walls 32' of the hopper terminate below the openings 33'. In this construction the walls are preferably made somewhat higher and this construction is thus particularly desirable for larger sized mills. The hopper wall 32' is preferably provided with a light transmitting section 32a through which light is passed from the interior of the casing to the hopper where the illumination is made effective upon the coffee therein. Openings 33' are either transparent or translucent to provide for viewing the coffee contents of the hopper.

The cover and the hopper construction are preferably removable as a unit and are held in place by the cooperating portions of the two housing sections 17 and 18, the lower discharge end of the hopper when in assembled position extending into the opening 14 in the burr casing, to provide for supplying coffee thereinto.

A gate member 35 comprising a pivoted vane, is positioned within the entrance to the burr casing, and adapted to control the introduction of coffee from the hopper into the grinding mechanism itself.

The motor shaft 40 extends in overhanging relation, and is suitably journalled in a bearing provided in the casing 13, its overhanging end being provided with a rotary burr 41 which is adapted to cooperate with a stationary burr member 42 affixed to the burr casing itself. The rotary burr 41 is so mounted on the shaft as to be slidable thereon, as by means of a spline 43, to provide for its adjustment axially of the shaft with respect to the stationary burr 42, such spacing of the burrs providing for the control of the degree of fineness of grind of the coffee. A suitable spring means 44 mounted on the shaft 40 provides for normally urging the rotary burr away from the fixed burr.

Grade selector means is provided for controlling the positioning of the rotary burr, in the controlling of the fineness of grind. This grade selector mechanism comprises a control member 45 extending through an opening in the housing section 18 so that it is operable from the exterior of the mill. As shown this means may comprise a manually operable ring member 46 suitably mounted upon a beveled disk 47 providing for the ready operation by the store clerk in the adjustment of the fineness of grind. The beveled face 47 is preferably provided with a series of indications 48 arranged around its periphery, which are adapted to cooperate with a fixed index pointer 49 to indicate to the clerk the position of the grade selector means, and consequently the condition of grind for which the mill is adjusted.

Attached to the exterior grade selector control mechanism is a threaded cylindrical portion 50 extending inwardly of the housing and adapted to cooperate with a spiral groove arranged in a stationary part 51 of the frame, so that upon rotation of the grade selector means the entire mechanism is caused to move axially of the shaft of the motor. The cylindrical portion is constructed to provide a bearing at its inner end 52 for supporting an operating member 53 having threaded engagement at 54 with the outer disk 47. A locking bar 55 also threadedly engages the member 54, and is itself held against rotation by means of a pair of screws 56 passing through disk 47. Upon releasing the tension on these screws, the member 54 may be adjusted from the exterior of the mill to provide for zero adjustment; and when the locking screws are tightened, the member 54 will be retained in its predetermined adjusted position with respect to the grade selector parts. At its inner end the member 53 carries a bearing block 57 adapted to bear against the splined rotary burr 41, and to provide for axially adjusting the same in response to the rotation of the grade selector, to provide varying degrees of fineness of grind.

A spring pressed plunger 60 is positioned on the grade selector control means, and cooperates with a fixed ring 61 having a series of depressions therein, to provide for yieldingly retaining the grade selector in the predetermined grinding positions corresponding to different grades of fineness. Limit means may also be provided cooperating with such plunger 60, to prevent normal rotation of the grade selector beyond the predetermined grinding range, but permitting complete rotation of the grade selector mechanism for removal from the machine, upon manual retraction of this plunger.

Means are provided in accordance with this invention for visually indicating to the purchaser the particular grade of fineness for which the mill is set. This means comprises a shaft 70 which is supported and guided by means 71 which confines movement of the shaft to an axial movement. This shaft is arranged to engage, at its outer end, a cam surface 72 formed upon the inner face of the grade selector mechanism resilient means 73 providing for maintaining the shaft in contact with the cam surface. As the grade selector is rotated, it also moves inwardly in an axial direction, and causes a corresponding axial movement of the shaft 70 against the action of compression spring 73. The shaft carries a rack 74 which has interengagement with a pinion 75 mounted upon a right-angularly positioned shaft 76, this shaft being supported in suitable bearings 77. The overhanging end 78 of the shaft is provided with a bracket 79 having an arcuately arranged sector portion 80 provided with elongated slot 81. A link member 82 has a sliding engagement in this slot, and at its opposite end is adapted to operate a bell crank lever 83. The bell crank carries an indicating means such as the arrow 84, which is adapted to swing about its axis in response to the rotation of shaft 76. The visible portion of the arrow is viewed through an opening 85 of generally arcuate character formed in a plate 86 which is visible from the exterior of the mill. This plate also carries a series of stationary designations such as "Open pot," "Drip pot" and the like, indicative of the varying grades to which the coffee is to be ground. The movable arrow may also carry a designating word such as the word "For," and in its movement as controlled by the positioning of the grade selector, thereby points definitely to the particular setting of the mill, and assurance is provided the purchaser that the mill is set to grind in accordance with his particular wishes. The indicating mechanism being entirely protected within the interior of the device and inaccessible to the operator, it is assured that the device correctly indicates the setting of the mechanism at all times.

The elongated slot 81 permits of the adjustment of the grade selector and the associated mechanism into a non-grinding position, leaving the indicating device 84 in its lowermost position as illustrated. However upon the operation of the grade selector to any one of its several grinding positions, shaft 70 is cammed inwardly the proper corresponding amount and rack and pinion 74, 75 effect rotation of shaft 76. Segment 80 moves upwardly, and the link 82 contacts with the end of the arcuate slot, and bell crank 83 moves the arrow 84 into proper indicating position. It will be further noted that the grade selector mechanism is so constructed and arranged with respect to the indicator and interlock parts that it can be readily removed from assembled position without disturbing these parts; and likewise the grade selector can be easily reassembled with the assurance that it will provide proper interlock and indicating operations without requiring additional connections or adjustments. Furthermore the grade selector parts are removable and replaceable through an opening in the housing so that no change of parts or housing structure is required. In addition all parts for feeding ground and unground coffee during the grinding operation, and when disassembled for repair, etc. are closed from the space within the housing to thus insure keeping all operating parts within the housing free from ground coffee, dust, etc.

Means are preferably provided for effecting illumination of this indicating device, and for this purpose the plate 86 may, if desired, be made of translucent material, and may be backed by means of an upwardly sloping reflector member 87, spaced somewhat from the plate 86, in conjunction with a light source 88. These parts are positioned, as illustrated in Fig. 4, to provide for casting an effective quantity of light upon the translucent plate, the reflector further serving to concentrate the light rays upon the plate. Furthermore the arrow may also be made of translucent material if desired, in order to give a corresponding appearance when viewed from the exterior. Preferably the light source 81 is controlled by or in accordance with the position of the motor switch, so that simultaneously with the closing of the motor switch, and the beginning of the operation of the mill, the indicating device will be illuminated. The same light source may serve to illuminate the openings 33, 33', and 32a.

In the merchandising of coffee in retail stores, although adjustable grinding devices have been provided, it has sometimes been found that the clerks failed to ascertain the wishes of the individual customer and to adjust the setting of the mill accordingly. The indicating means just described makes it easy for the customer to see that the mill is properly adjusted and that the coffee is being correctly ground. And in conjunction with such indicating means, the present invention provides means for requiring an adjustment of the grade selector for each operation of the mill, and for preventing the operation of the mill until after the grade selector has been adjusted to a predetermined grinding position. An operation of the grade selector means to a definite grinding position being required, and the actual position of adjustment being clearly indicated to the customer, there is more assurance that the clerk or operator will ascertain the wishes of the individual customer and adjust the mill accordingly. This means includes the shaft 70 previously described, which at its inner end is provided with a right-angularly extending portion 90 serving as an interlock member. The portion 90 is preferably wedge-shaped in cross section with the apex of the wedge extending toward the cooperating interlock member. The motor switch is shown at 91, and is connected by means of link 92 to a plate 93 fastened to cross shaft 94, suitably supported on the frame of the machine. The shaft 94 extends through the casing of the machine and is provided with a manual control handle 95. Means such as spring 96 serves to urge the shaft in the direction of rotation which will cause the switch to be moved to off position. The shaft also carries the gate member 35 for controlling the admission of coffee from the hopper into the grinding chamber, the arrangement of the gate and associated parts being such that the gate is closed when the motor switch is turned to off position, and vice versa.

Plate 93 is provided with a pair of pendant members 97 and 98, both of these members being pivoted to the plate 93. The interlock member 90 is movable toward and away from the pendants, such movement being controlled by the axial adjustment of shaft 70 in accordance with the setting of the grade selector, as previously described. The pendant 97 extends downwardly and directly overlies the interlock member 90 when such member is in its outermost position, corresponding to the non-grinding condition or setting of the grade selector. In such position when it is attempted to lift handle 95 to move the switch from off to on position, and open the gate, pendant 97 strikes the interlock member and prevents such movement until the grade selector has been moved from its completely open or non-grinding position, into one of its several grinding positions. In any of the grinding positions the shaft 70 is moved inwardly sufficiently so that interlock member 90 passes under and clears pendant 97 permitting the control handle 95 to be lifted to start the motor, and open the gate to admit coffee to be ground.

The other pendant member 98 is provided with a notch 99 and is also slotted at 100 in an arcuate manner, through which slot extends the pin 101 fixed to the plate 93, permitting a predetermined limited movement of the pendant 98 on its supporting plate. This construction is such that when the grade selector is adjusted to any grinding position, with the switch in off position, and the switch subsequently turned to on position to effect starting of the mill, the edge of interlock member 90 will engage in slot 99. By reason of the pivoting of pendant member 98 on the plate 93, there occurs a locking action of the member 90 in slot 99 following their engagement, such action preventing return of the handle 95 and associated parts to the off position. This pivoting of the pendant also provides for establishing the interlocking engagement in all of the positions of member 90 corresponding to the several grinding positions of the grade selector, the pendant contacting the interlock member and thereafter moving on its support to the extent necessary, as the switch is being closed. Engagement and subsequent interlocking is facilitated by the wedge shaped construction of member 90. As shown in Fig. 10 the lower surface of member 90 is substantially horizontal and cooperates with the lower surface of slot 99. The upper surface of member 90 slopes at such an angle that the member will readily engage slot 99 at all relative positions of the parts, and remain in engagement until withdrawal of member 90. Thus the mill will continue to operate and cannot be shut off until the grade selector is returned to the non-grind position withdrawing member 90 from engagement in the slot. The locking action is thereby released and spring 96 returns handle 95 to off position, stopping the motor and closing the gate 35.

This mechanism thus requires that before the mill can be placed in operation, the grade selector be operated to a selected grinding position, proper indication thereof being given the customer. When the grinding is finished, the grade selector must be turned to the non-grind position and the mill is then stopped, in preparation for a subsequent cycle of operation in similar sequence.

Coffee is made up of a solid bean portion which is subject to being granulated, and a lighter chaff portion. During the grinding operation the chaff has a tendency to separate in flakes, and because of its different characteristics, it may assume an electrostatic charge which causes its segregation from the particles of ground bean. It is desirable however to provide a homogeneous mixture of ground chaff and bean, and to avoid this objectionable segregation of any of the constituents. Accordingly, the present invention provides a mixing chamber, located at the outlet side of the burrs, in which the ground materials are subjected to such pressure and rubbing contact as to disseminate the electrical charge, and during which the particles of the bean become coated with and disseminated through the particles of chaff. For this purpose there is provided a discharge chamber 110 of limited dimensions, into which the coffee is fed directly from the burrs. The walls of this chamber diverge outwardly as shown in order to facilitate the complete discharge of coffee therefrom. Over the end of the chamber is positioned a pivoted gate 111 which in its closed position, to which it is urged by gravity, serves to maintain the material within the chamber under a predetermined limited degree of pressure. Thus as the ground coffee is fed into the chamber from the grinding burrs, it forces the gate upwardly against the action of gravity, and the ground mass falls outwardly from the discharge connection 112. During its passage through the discharge chamber the particles of ground coffee are subjected to certain pressure, and undergo frictional and rubbing contact with each other and with the walls of the chamber. Such action serves to dissipate electrostatic charge and is effective in overcoming the tendency for the ground bean to separate from the chaff, providing for their homogeneous intermixture and discharge.

Following the termination of the grinding action there is normally a small quantity of coffee remaining within the chamber 110. In order to effect a complete discharge of this remaining portion so that the mill will be cleared for a subsequent operation, means are provided for lifting the gate 111. This may be done by a manual control (not shown) extending to the exterior of the casing so that the operator may raise the gate at any desired time. Preferably however means are provided for automatically lifting the gate at the termination of the grinding operation. For this purpose the gate is provided with an operating arm 113 extending upwardly into position to be actuated by means of a notched plunger 114 housed within a suitable casing 115 directly over the outlet connection 112. Spring means 116 tends to urge the plunger 114 in the direction to effect the raising of the gate. Means are provided for counteracting the spring, and preventing its control of the gate. This means comprises a cam 117 which is mounted upon the end of shaft 76, so that it is rotated in accordance with the positioning of the grade selector means. When the grade selector is adjusted to any one of its several grinding positions, the high point of the cam contacts the end of plunger 114, forcing the same back against the spring 116 to permit free play of the gate within the notched portion of the plunger, thereby permitting the gate to move under the action of gravity, and to control discharge of the coffee as above described. At the end of the grinding operation, when the grade selector is turned to its off or non-grind position, releasing the interlock mechanism previously described and simultaneously causing the motor to shut off, the low point of the cam is brought opposite plunger 114, and spring 116 then effects movement of the plunger outward in such direction as to cause the end of the notch to contact lever 113. This effects a lifting of the gate 111 from its closed position, and the final slowing down movement of the grinding burrs serves to completely discharge the remaining ground material within the discharge chamber 110. This assures a complete discharge for each operation of the mill, and further that the mill will not retain, for a subsequent grind, any portion of the coffee ground at a previous operation which might be of different fineness characteristics.

It is not essential to the control of the discharge chamber that the interlock means previously described be used. Fig. 9 shows a modification in which an alternative mechanism for operating the discharge gate is provided. As shown in Fig. 9, the motor switch control shaft 94 is provided with the plate 93 to which is attached the operating link 92 for the motor switch. This plate also carries an operating link 120 to the end of which is attached a camming block 121 adapted to cooperate with the end of the plunger member 114. The plunger 114 and the associated mechanism corresponds to that previously described so that it is apparent that a similar operation is effected. In the present case however upon the closing of the gate or the coordinated opening of the motor switch, followed by the slowing down of the motor, the gate mechanism is operated to effect the raising of the gate and to thereby permit the discharge of the small quantity of ground material contained in chamber 110, the gate remaining in closed or gravity operated position during the grinding operation and as long as the switch is in on position. Preferably the indicating mechanism as above described is also provided so that proper indication of the setting of the grade selector is afforded the operator.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A coffee mill of the character described comprising grinding means including a plurality of grinding burrs, grade selector means movable axially for adjusting the spacing of said burrs to regulate the fineness of grind, an operating member engaged by said grade selector means and adapted to be moved in response to axial movement of said grade selector means, said operating member carrying a rack, a shaft carrying a pinion having operative engagement with said rack, and an indicating member operated by said shaft in accordance with the position of said grade selector means for indicating the setting of said grinding means.

2. A coffee mill of the character described comprising a motor, grinding means driven by said motor, a motor switch, grade selector means operable from a neutral position to a plurality of grinding positions to control the fineness of grind of said grinding means, an operating member actuated by said grade selector means, means controlled by said operating member for preventing the closing of said motor switch until said grade selector means has been moved from its neutral position to a grinding position, and means also controlled by said operating member for providing visual indication of the setting of said grinding means.

3. A coffee mill of the character described comprising a motor, grinding means operated thereby, a switch for said motor, grade selector means operable from a neutral position to a plurality of grinding positions to control the fineness of grind of said grinding means, an operating member actuated by said grade selector means, means controlled by said operating member for preventing the opening of said motor switch until after the grade selector means has been moved from a grinding position to said neutral position, and indicating means also controlled by said operating member providing visual indication of the setting of said grinding means.

4. A coffee mill of the character described comprising grinding means including a plurality of grinding burrs, a discharge outlet from said grinding means, yielding confining means associated with said discharge outlet for maintaining the ground coffee under pressure during its passage through said discharge outlet, grade selector means movable from a neutral position to a plurality of grinding positions to adjust the spacing of said burrs to regulate the fineness of grind, an operating member engaged by said grade selector means and adapted to be moved in response to movement of said grade selector means to a plurality of positions corresponding to the position of said grade selector means, means controlled by movement of said operating member for effecting visual indication of the setting of said grinding means, and additional means controlled by movement of said operating member to a position corresponding to said neutral position of the grade selector for effecting release of said yielding confining means.

5. In a mill, a casing, power operating grinding mechanism within said casing, a hopper communicating with said grinding mechanism, means providing a passageway extending from said mechanism, means extending beyond said casing and movable with respect thereto, to adjust said grinding mechanism, shiftable means for indicating the condition of said mechanism and associated with said casing, means rockingly supported within said casing and coupled to said indicating means to actuate the latter, a lever rockingly mounted within said casing and link connected to said last named means to cause shifting of said indicating means, and means extending from said adjusting means and operatively connected to said lever to rock the same in response to said grinding mechanism being adjusted.

6. A coffee mill of the character described comprising grinding means including a plurality of spaced grinding burrs, a housing entirely enclosing said grinding means, grade selector means mounted in an exterior wall of said housing for operation from the exterior of said housing and axially movable for adjusting the spacing and hence the fineness of grind of said grinding means, said mounting providing for removal of said grade selector means as a unit from the exterior of said housing, means separately mounted within said housing in a position protected against access from the exterior of said machine for giving visual indication of the spacing of said grinding means and thus indicating the fineness of grind, and means located within said housing and engageable by said grade selector means when in assembled position for causing actuation of said indicating means in accordance with the position of said grade selector means.

7. A coffee mill of the character described comprising a housing, grinding means located in said housing including grinding burrs, grade selector means adjustable to control the spacing of said grinding burrs to regulate the fineness of grind, means for mounting said grade selector means in said housing providing for adjustment from the exterior thereof and for removal therefrom independently of the grinding means, means located within said housing for visibly indicating the setting of the grinding means, said indicating means being constructed and arranged to remain within the housing upon removal of said grade selector means therefrom and including an operative member having operative interconnection with said indicating means, and means resiliently urging said operative member into contact with said grade selector means when the latter is in assembled operative position to establish an actuating connection between said grade selector means and said indicating means.

8. A coffee mill of the character described comprising grinding means including a plurality of grinding burrs, a housing completely enclosing said grinding means, grade selector means accessible through the wall of said housing and having axial movement for adjusting the spacing of said burrs to regulate the fineness of grind, said grade selector means being removable from the exterior of said housing, an operating member separately supported within said housing in a position to be contacted by said grade selector means eccentrically of the axis thereof when in assembled position, means providing for movement of said operating member in direct response to axial movement of said grade selector means, and means controlled by said operating member for producing visual indication of the setting of said grinding means upon the exterior of said housing.

9. A coffee mill of the character described comprising grinding means including a plurality of grinding burrs, a housing enclosing said grinding means, grade selector means mounted in and accessible through the wall of said housing and axially movable therein for adjusting the spacing of said burrs to regulate the fineness of grind, said mounting providing for removal of said grade selector means from the exterior of said housing, an operating member separately supported within said housing in a position to be contacted by said grade selector means upon assembly thereof in said wall, means providing for movement of said operating member in direct response to axial movement of said grade selector means, means operated by said operating member for providing visual indication of the setting of said grinding means, and means for adjusting the zero setting of said burrs independently of said indicating means to maintain the proper relation between the actual setting of said burrs and the indicated setting thereof.

10. A coffee mill of the character described comprising a housing, grinding means enclosed within said housing, grade selector means for adjusting said grinding means to a plurality of grades of fineness of grind, indicating means positioned within and visible from the exterior of said housing, means for mounting said indicating means within said housing independently of said grade selector means, said grade selector means being bodily removable from said housing without removal of said indicating means therefrom, and means arranged to have cooperative engagement with said indicating means and with said grade selector means upon the assembly of said grade selector means in operative position upon said housing for actuating said indicating means to indicate the setting of said grinding means.

11. A coffee mill of the character described comprising grinding means, grade selector means operable from a neutral or non-grind position through a range of grinding positions, indicating means controlled by said grade selector means for providing visual indication of the setting of said grinding means, means for actuating said indicating means in accordance with the setting of said grade selector means throughout said range of grinding positions, and a lost motion connection within said actuating means effective to disable the control of said indicating means by said grade selector means when the latter is moved beyond said range of grinding positions and into said neutral position, to provide for said movement to neutral position.

12. In a mill, a casing, power operating grinding mechanism within the casing, means for supplying material to be ground to said mill and for discharging the ground product therefrom, means extending beyond said casing and movable with respect thereto to adjust said grinding mechanism, a lever rockingly supported within said casing and having an indicating portion visible from the exterior thereof, means for actuating said lever through a range of positions corresponding to the settings of said adjusting means including an operating shaft, means for effecting operation of said shaft in response to adjusting movement of said adjusting means, and means for interconnecting said operating shaft and said lever to effect corresponding actuation of the latter.

13. In a mill, a casing, power operating grinding mechanism within the casing, means for supplying material to be ground to said mill and for discharging the ground product therefrom, means extending beyond said casing and movable with respect thereto to adjust said grinding mechanism, a lever adjustably supported within said casing and having an indicating portion visible from the exterior thereof, means for actuating said lever through a range of positions corresponding to the settings of said adjusting means including an axially movable shaft, means for moving said shaft in response to adjusting movement of said adjusting means, and means for interconnecting said axially movable shaft and said lever to effect corresponding actuation of the latter.

14. A coffee mill of the character described comprising a housing, grinding means located in said housing including grinding burrs, grade selector means adjustable over a series of settings to control the spacing of said grinding burrs to regulate the fineness of grind, means for indicating to the customer the setting of said grade selector means including a lever rockingly supported within said housing and having an indicating portion visible from the exterior thereof, means for moving said lever through a range of positions corresponding to the settings of said grade selector means including a rotatable shaft, means for rotating said shaft in response to adjusting movement of said grade selector means, and means for interconnecting said rotatable shaft and said lever to effect corresponding movement of the latter.

DAVID A. MEEKER.